United States Patent [19]

Haraikawa et al.

[11] 4,222,465

[45] Sep. 16, 1980

[54] DISC BRAKE FRICTION PAD RETAINING STRUCTURE

[75] Inventors: Tetsuo Haraikawa, Funabashi; Koichi Tamura, Tokyo, both of Japan

[73] Assignee: Tokico Ltd., Kawasaki, Japan

[21] Appl. No.: 32,108

[22] Filed: Apr. 20, 1979

[30] Foreign Application Priority Data

Apr. 20, 1978 [JP] Japan ................... 53-46835

[51] Int. Cl.² ............................................. F16D 65/02
[52] U.S. Cl. ................... 188/73.5; 188/73.6; 192/30 V; 192/70.13; 192/DIG. 1
[58] Field of Search ............ 188/73.3, 73.5, 73.6, 188/205 A; 192/30 V, 70.13, DIG. 1

[56] References Cited

U.S. PATENT DOCUMENTS 4,034,857  7/1977  Kondo ........................ 188/73.5 X

FOREIGN PATENT DOCUMENTS 2801069  7/1978  Fed. Rep. of Germany .......... 188/73.6

2360012  3/1978  France ........................ 188/73.3

Primary Examiner—George E. A. Halvosa
Attorney, Agent, or Firm—Wenderoth, Lind & Ponack

[57] ABSTRACT

A disc brake of the type including a stationary supporting member, a pair of friction pads supported on the supporting member and slidable in the direction of the axis of a rotatable disc, a caliper supported on the supporting member and slidable in the direction of the axis of the disc, a piston provided in the caliper for acting on one of friction pads to urge it against one surface of the disc, and a pad spring disposed between the caliper and the friction pads. The other of the friction pads is mounted on the supporting member such that the pad can be removed from the supporting member by displacing the friction pad and the caliper on the supporting member a predetermined distance past the normal operational range. The pad spring engages with the supporting member and with the other friction pad thereby limiting the displacement of the other friction pad with respect to the supporting member.

4 Claims, 10 Drawing Figures

DISC BRAKE FRICTION PAD RETAINING STRUCTURE

BACKGROUND OF THE INVENTION

This invention relates to disc brakes and, particularly, to improvements in so-called floating caliper type disc brakes.

One prior art floating caliper type disc brake includes a pair of friction pads disposed on the opposite sides of a rotatable disc, a supporting member adapted to be secured to a non-rotatable part of a vehicle and slidably supporting thereon the pair of friction pads for movement in the direction of the axis of the disc, and a caliper slidably supported for movement in the direction of the axis of the disc on the supporting member and having a piston for pressing one of the friction pads against one surface of the disc and a leg portion engaging with the other friction pad for pressing it against the other surface of the disc. It has been proposed to mount the friction pads on the supporting member such that the friction pads can be mounted on or removed from the supporting member by displacing the caliper in the direction of the axis of the disc on the supporting member. In such disc brakes, the friction pad exchanging operations can be easily performed, but the caliper may occasionally be displaced and the friction pads come off from the supporting member.

SUMMARY OF THE INVENTION

An object of the present invention is to prevent the aforementioned shortcomings and, according to the present invention, a pad spring disposed between the caliper and the friction pads for resiliently engaging therewith to prevent vibrations of the friction pads has a first retaining portion engaging with the supporting member and a second retaining portion adapted to engage with the other friction pad thereby preventing the friction pad from coming off the supporting member.

More particularly, the disc brake according to the present invention is of the type including a pair of friction pads disposed on opposite sides of a rotatable disc, a supporting adapted to be secured to a non-rotatable part of a vehicle and slidably supporting thereon the pair of friction pads for movement in the direction of the axis of the disc, a caliper supported for sliding movement in the direction of the axis of the disc on the supporting member and having a piston for pressing one of the friction pads against the disc and a leg portion engaging with the other friction pad for pressing it against the disc, and a pad spring disposed between the caliper and the friction pads, and this disc brake is characterized in that the other friction pad can be removed from the supporting member by displacing it in the direction away from the disc by a predetermined amount beyond the normal operating range, the caliper can be displaced by an amount exceeding the predetermined amount in a direction separating the leg portion of the caliper from the disc beyond the normal operational range of the caliper, and the pad spring has a first retaining portion for engaging with the supporting member and a second retaining portion for engaging with the other friction pad for preventing the displacement of the other friction pad with respect to the supporting member by an amount exceeding the predetermined amount.

BRIEF DESCRIPTION OF THE DRAWINGS

Further objects and advantages of the present invention will be described in conjunction with the attached drawings exemplifying the present invention, in which.

DETAILED DESCRIPTION OF THE PREFERRED EMBODIMENT

Figure 1:
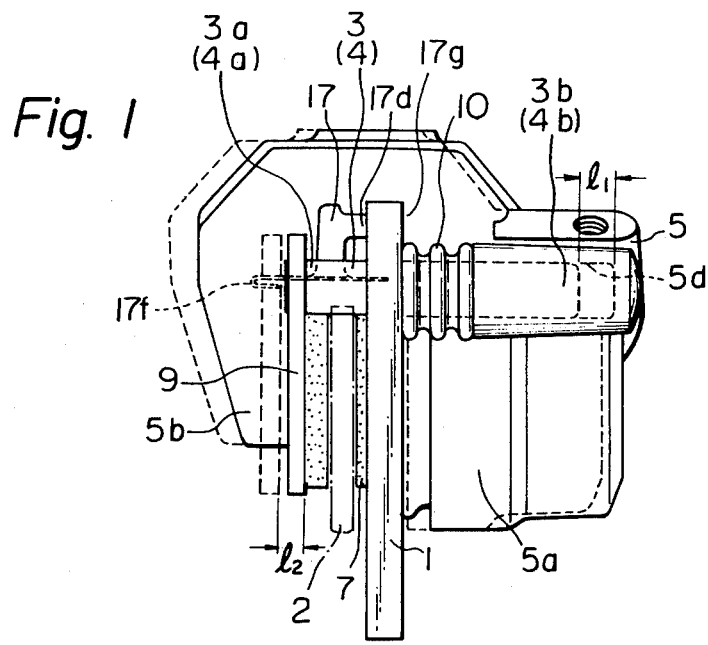
FIG. 1 is a side view of a disc brake according to the present invention.
Figure 2:
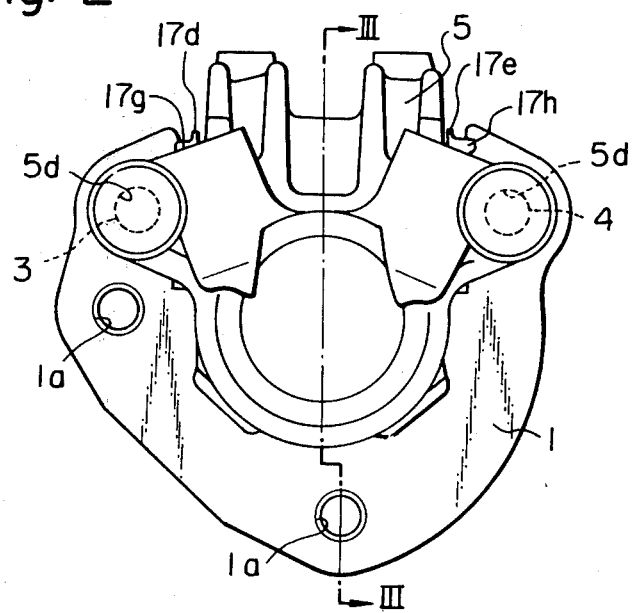
FIG. 2 is a front view of the disc brake of FIG. 1.

The disc brake shown in the drawings comprises a mounting bracket 1 which has a generally plate-like form and is adapted to be secured to a non-rotatable part of a vehicle such as a chassis of a motor-cycle (not shown) by means of screws (not shown) engaging with threaded bores 1a. The mounting bracket 1 is disposed on one side (the right side as viewed in FIG. 1) of a disc 2 which is rotatable with a wheel of the vehicle. A pair of pins 3 and 4 are secured to the mounting bracket 1 by suitable means such as force-fitting, welding or the like, and the pins 3 and 4 are spaced from each other in the direction of the circumference of the disc 2. A first end portion 3a and 4a of each of the pins 3 and 4 extends in a direction parallel to the axis of the disc 2 and across the disc 2 thereby straddling a portion of the circumference of the disc 2, and a second end portion 3b and 4b thereof extends in the opposite direction or the rightward direction as viewed in FIG. 1. The mounting bracket 1 and the pins 3 and 4 constitute a supporting member according to the present invention.

A caliper 5 is slidably supported on the second end portions 3b and 4b of the pins 3 and 4, and a cylinder 6 is formed in a leg portion 5a of the caliper 5 and opens toward the disc 2 for slidably and liquid-tightly receiving therein a piston 8 which is adapted to press against the disc 2 a first friction pad 7 which will be described hereinafter in detail.

The caliper has another leg portion 5b which straddles the disc 2 and extends to the rear side (the left side as viewed in FIG. 1) of a second friction pad 9 for pressing it against the disc 2. The sliding portions of the pins 3 and 4 which slide in and out of bores 5d formed in the caliper 5 for slidably receiving the pins are protected by boots 10, and the sliding portion of the piston 8 which slides in and out of the cylinder 6 is protected by a boot 11 which prevents the ingress of dust or water. The liquid tightness between the cylinder 6 and the piston 8 is maintained by a seal 12 which also acts to retract the piston 8 for releasing the braking action.

Figure 4:
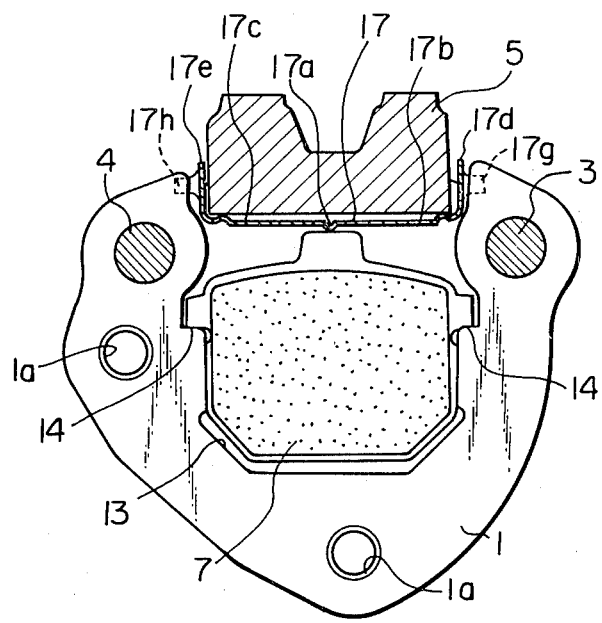
FIG. 4 is a sectional view taken along line IV—IV in FIG. 3.
Figure 5:
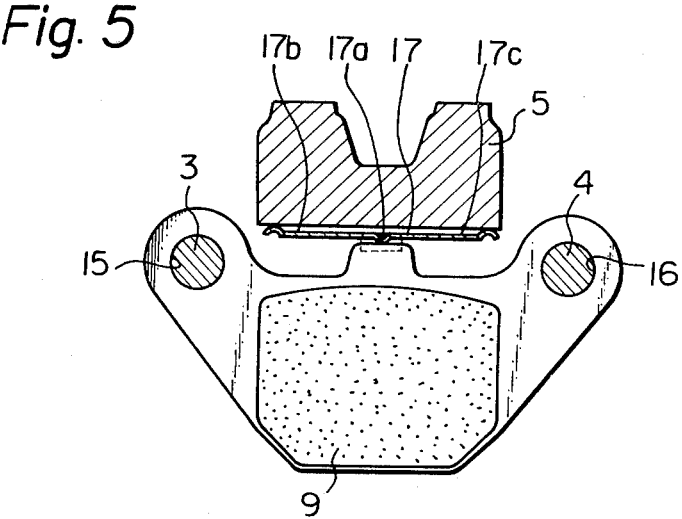
FIG. 5 is a sectional view taken along line V—V in FIG. 3.
Figure 6:
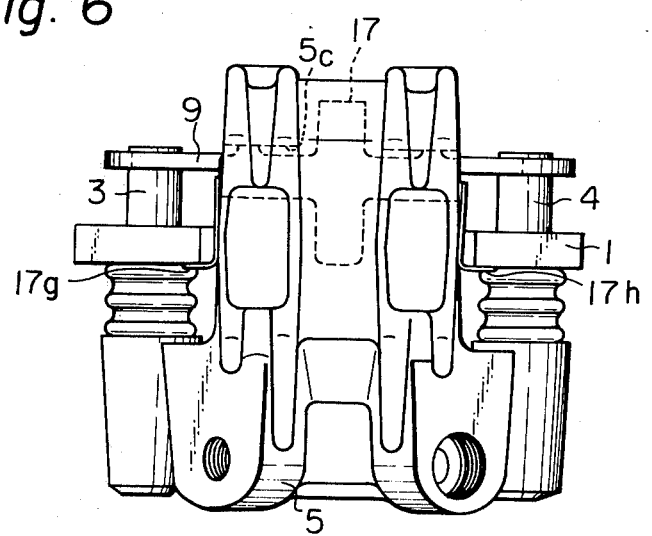
FIG. 6 is a plan view of the disc brake of FIG. 1.
Figure 7:
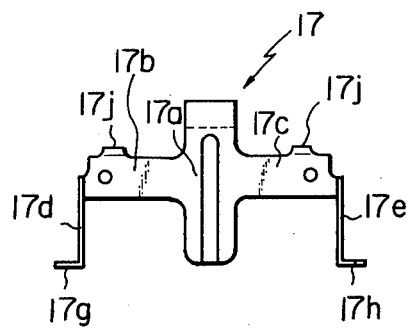
FIGS. 7, 8 and 9 are a front view, side view and bottom view, respectively, of a pad spring of the disc brake of FIG. 1.
Figure 8:
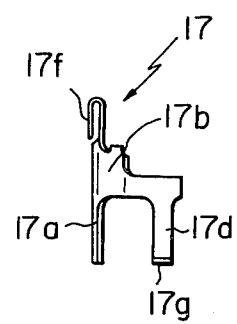
Figure 9:
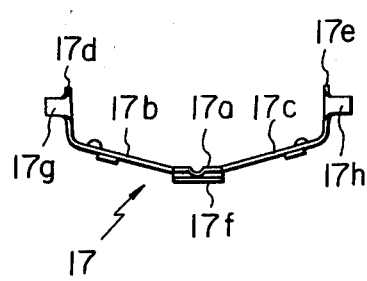
Figure 10:
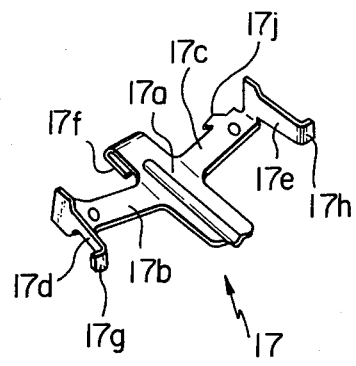
FIG. 10 is a perspective view of the pad spring.

A recess 13 is formed in the mounting bracket 1 for receiving the first friction pad 7 and, shoulders 14 are formed in the upper portion of the recess 13 for slidably mounting thereon correspondingly shaped lugs of the first friction pad 7 as clearly shown in FIG. 4. Thus, the first friction pad 7 is displaceable in a direction parallel to the axis of the disc 2. A pair of bores 15 and 16 is formed in the second friction pad 9 for receiving therethrough the first end portions 3a and 4a of the pins 3 and 4. Thus, the friction pad 9 is mounting on the supporting member and is displaceable in a direction parallel to the axis of the disc 2.

A pad spring 17 is disposed between the caliper 5 and the friction pads 7 and 9 for preventing vibrations of the friction pads, and the configuration of the pad spring 17 is shown in FIGS. 7 through 10. The spring 17 comprises a main body 17a, arms 17b and 17c projecting from opposite sides of the main body 17a, first retaining portions 17d and 17e extending parallel to the main body 17a (downward, as viewed in FIG. 7,) from the tip ends of respective arms 17b and 17c, and a second retaining portion 17f which is formed by bending backwards the tip end of the main body 17a as clearly shown in FIG. 8. When the pad spring 17 is resiliently disposed between the caliper 5 and the friction pads 7 and 9, the free end of the second retaining portion 17f is disposed on the rear side of the friction pad 9, the arms 17b and 17c resiliently engage with the caliper 5, and the main body 17a resiliently engages with the upper or radially outer surface of the friction pads 7 and 9. Further, bent portions 17d and 17e on the ends of the first retaining portions 17d and 17e which are toward the friction pad 7 engage with the side surface of the mounting bracket 1 toward the cylinder 6 (the right side surface as shown in FIG. 1). Thus, the displacement of the friction pad 9 on the pins 3 and 4 in the leftward direction, as viewed in FIG. 1, is controlled so that the friction pad 9 is maintained in its normal operational range. Further, the arms 17b and 17c of the pad spring have projections 17j for engaging with the axially inner surface 5c of the leg portion 5b.

Figure 3:
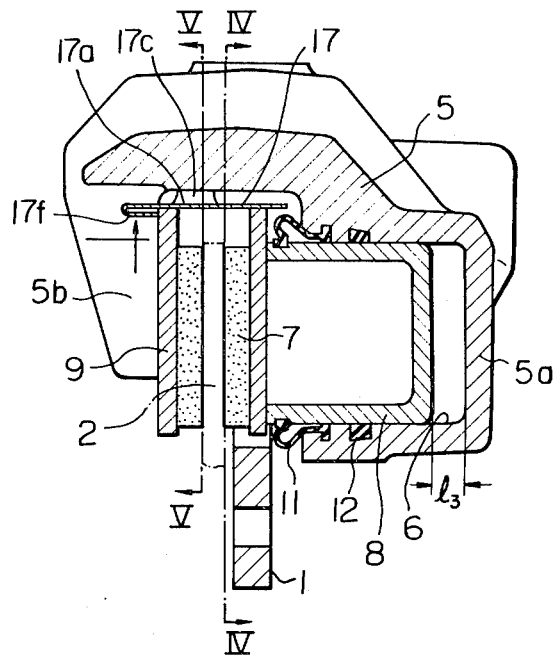
FIG. 3 is a sectional view taken along line III—III in FIG. 2.

The disc brake having the construction heretofore described operates as follows. When oil under pressure is introduced into the cylinder 6, the piston 8 moves leftward as viewed in FIG. 3 and tightly presses the friction pad 7 against one surface of the disc 2. The caliper 5 guided on the pins 3 and 4 moves rightward as viewed in FIG. 3 according to the reaction force of the piston 8 so that the leg portion 5b of the caliper 5 tightly presses the friction pad 9 against the other surface of the disc 2. Thus, the disc 2 is clamped between the friction pads 7 and 9 and is braked.

Now, a description will be given of the friction pad exchanging operation.

In FIG. 1, the friction pad 9 and the caliper 5 are respectively located at the most leftward positions in the normal operational range $l_2$ or in the condition when the friction pads 7 and 9 are new and oil under pressure is not supplied into the cylinder 6. According to the invention, the caliper 5 can be displaced leftward in the drawing by a distance $l_1$, and the friction pad 9 can be removed from the pins 3 and 4 by displacing the friction pad 9 in the direction away from the disc 2 by a distance $l_1$, and the piston 8 can be displaced rightward, as viewed in FIG. 3, in the cylinder 6 by a distance $l_3$. According to the invention, $l_1 > l_2$ and $l_3 > l_2$. Therefore, the caliper 5 can be displaced leftward by an amount larger than the distance $l_2$ as viewed in chain lines in FIG . 1. However movement of pad 9 beyond the normal range $l_2$ is blocked by portion 17f of the spring 17. To move pad 9 a distance greater than $l_2$ the retaining portion 17f of the pad spring 17 must first be disengaged by pushing the portion 17f upward or in the direction of the arrow in FIG. 3 from the rear side surface or the left side surface of the friction pad 9, the friction pad 9 can easily be displaced in the direction away from the disc 2 by the distance $l_2$ and, thus the friction pad 9 can be removed from the pins 3 and 4. Thereafter, the caliper 5 is displaced rightward in FIG. 3 and the friction pad 7 is removed from the mounting bracket 1 and through a space formed between the piston 8 and the mounting bracket 1.

According to the present invention, the relationship between the distances or the amounts of displacement $l_1$ and $l_2$ is necessarily be $l_1 > l_2$, however, the distance or the amount of displacement $l_3$ is not required to be larger than $l_2$. When the distance $l_3$ is not larger than $l_2$, the pad exchanging operation must be performed by, firstly, dismounting the disc brake from the vehicle, secondly, removing the friction pad 7 from the mounting bracket 1 and, thereafter, displacing the caliper 5 and removing the friction pad 9. In mounting new friction pads on the disc brake, the procedures are reversely performed.

The retaining portion 17f and the retaining portions 17d and 17e may engage respectively with the friction pad 9 and the bracket 1 in the condition of FIG. 1 or at the most leftward position of the friction pad 9 in the normal operational range but, preferably, there is a small clearance left between the retaining portion 17f and the friction pad 9 or between the mounting bracket 1 and the retaining portions 17d and 17e of the pad spring 17 so as to allow an incidental overtravel of the friction pad 9 caused caused by a condition such as a momentary deformation of the disc 2 or the like.

Although the present invention has been described in detail with respect to one embodiment, the invention is not limited to the embodiment described and may be applied to disc brakes of other types such as a disc brake wherein the friction pad 7 is also slidably supported on the pins 3 and 4, a disc brake wherein the supporting member is formed of a casting or the like so as to have a generally inverted U-shaped configuration straddling a portion of the circumference of a disc, and pins are secured to the caliper and slidably received in guide bores formed in the supporting member, or the like.

As described heretofore in detail, in the disc brake according to the invention the friction pads can easily be exchanged by displacing the caliper, and further, even though the caliper 5 has been displaced by an amount exceeding the predetermined distance $l_2$, in the condition wherein the disc brake is mounted on a vehicle or in handling or transporting the disc brake, the friction pad 9 is retained on the pins 3 and 4 by means of the pad spring 17, and thus the friction pads will not come off the disc brake. Further, the pad spring 17 of the present invention acts, similar to the pad spring of the prior art disc brakes, to prevent vibrations of the friction pads, and thus the number of parts is not increased.

What we claim is:
1. A disc brake comprising:
a rotatable disc;
a pair of friction pads having backing plates and disposed on opposite sides of said rotatable disc;
a supporting member adapted to be secured to a non-rotatable part of a vehicle and slidable supporting said pair of friction pads thereon for sliding movement in a direction parallel to the axis of the disc;
a caliper slidably supported on said supporting member for sliding movement in a direction parallel to the axis of the disc and having a piston for pressing one of the friction pads against the disc and a leg portion engaging with the other friction pad, said other friction pad being movable on said supporting member for being removed from the supporting member by displacing the friction pad in the direction away from the disc by a predetermined amount, and said caliper being displaceable by an amount exceeding said predetermined amount and in a direction for moving the leg portion of the caliper away from the disc; and a pad spring disposed between the caliper and the pair of friction pads, said pad spring having a first retaining portion engaged with the supporting member and a second retaining portion engagable with the side of the backing plate of said other friction pad facing away from said disc, the distance between said first and second retaining portions in a direction parallel to the axis of the disc being sufficient for limiting the displacement of said other friction pad in the direction away from the disc to said predetermined amount when said second retaining portion is engaged with the backing plate of the friction pad, and said second retaining portion being resiliently distortable in the radially outward direction relative to the axis of said disc for freeing said other friction pad for removal from the supporting member and for returning to its undistorted position due to its resilience after said other friction pad has been removed.

2. A disc brake as set forth in claim 1 wherein said pad spring comprises an elongated main body portion extending parallel to the axis of the disc and along the longitudinal center line of the caliper and resiliently engaging the friction pads, and two arm portions extending in opposite directions from said main body portion in the direction of the circumference of the disc for resiliently engaging with the caliper, each of said arm portions including a portion extending parallel to said main body portion and having thereon said first retaining portion, one end of said main body portion having a radially inwardly projecting portion consittuting said second retaining portion.

3. A disc brake as set forth in claim 1 wherein said supporting member comprises a generally plate like member on one side of the disc, and a pair of parallel pins spaced in the direction of the circumference of the disc and extending in a direction parallel to the axis of the disc and on which the caliper and at least one of the friction pads are slidably mounted.

4. A disc brake as set forth in claim 3 wherein said pins extend in the opposite directions from the plate like member and having the caliper slidably mounted on the one ends and the other ends straddling the disc and having said other friction pad slidably mounted thereon.

* * * * *